(12) United States Patent
Nolan

(10) Patent No.: US 6,546,536 B1
(45) Date of Patent: Apr. 8, 2003

(54) SYSTEM AND METHOD FOR DISABLING SCHEMATICS

(75) Inventor: Stephen David Nolan, deceased, late of Dublin (IE), by Elizabeth Mary Nolan, legal representative

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 09/916,072

(22) Filed: Jul. 26, 2001

(51) Int. Cl.$^7$ .............................................. G06F 17/50
(52) U.S. Cl. ................... 716/11; 716/1; 716/5; 716/18
(58) Field of Search ............................ 716/1, 18, 5, 11

(56) References Cited

U.S. PATENT DOCUMENTS 5,249,133 A * 9/1993 Batra ........................ 364/489
5,325,309 A * 6/1994 Halaviati et al. ........... 364/488
5,867,399 A * 2/1999 Rostoker et al. ............ 364/489

* cited by examiner

Primary Examiner—David Nelms
Assistant Examiner—Thao Le
(74) Attorney, Agent, or Firm—Peter Kraguljac Calfee Halter & Griswold LLP; Lois D. Gartier

(57) ABSTRACT

A system and method for designing schematic diagrams of electronic circuits is provided. A library of electronic components represented in graphical form are selectable by a user for inclusion into a schematic diagram. The components are connected together to define a circuit that performs a function. In order to simulate and test a particular portion of the circuit rather than the entire circuit, the present invention provides a disabling routine that disables portions of the circuit not to be included in the simulation. The present invention allows a circuit designer/tester to focus on desired areas of a circuit while ignoring others.

14 Claims, 3 Drawing Sheets

SYSTEM AND METHOD FOR DISABLING SCHEMATICS

FIELD OF THE INVENTION

The invention relates generally to computerized circuit design systems and, more particularly, to a system and method for disabling components in schematic diagrams of electronic circuits. It will be appreciated that the invention finds particular application to software programs for creating and testing circuit schematics but also applies to other types of design tools such as Computer Aided Design (CAD) applications and hardware description languages.

BACKGROUND OF THE INVENTION

Schematic diagrams are considered by many circuit designers to be the most intuitive method of circuit design entry. Schematic diagram software programs allow a circuit design to be entered into computer memory in the form of a schematic diagram comprising circuit component symbols connected by signal paths (interconnection lines/nets). A circuit designer can "read" a schematic diagram displayed on a video screen and understand the interrelationships of the circuit components without a specialized knowledge of the schematic diagram software program.

A typical schematic diagram software program includes several software tools including a component generator for defining circuit components, a schematic editor for editing a schematic, a display generator for displaying the schematic and a netlist generator for creating a netlist file. A netlist is a computer memory file that describes the corresponding schematic diagram in a text based hardware description language. The netlist file includes a list of components (logic gates, flip flops, etc.) and interconnections between the components which represent a circuit design of the schematic. The component generator allows a user to define and store schematic components in a schematic component library.

A schematic component is comprised of two parts, namely, a schematic symbol which is displayed on a video monitor, and an underlying circuit design which defines the function of the schematic component. Schematic components are recognized by the design program as representing the functions of their underlying circuit designs. After completion of the schematic diagram, the netlist generator reads the schematic diagram and converts the circuit design into a netlist file. The netlist differs from a schematic diagram in form. The schematic diagram is a graphical illustration easily recognized by a user, while the netlist is a list of components and the lines which interconnect them, and is easily manipulated by a computer.

In order to test that a circuit is properly constructed to perform a desired function, the netlist file of the schematic is executed by a circuit simulator or synthesis application, which may include additional file format conversions to be readable by the simulator. Simulation of a circuit, however, can be time consuming and designers sometimes need to remove parts of the circuit either because they are not completed or because the designer wishes to focus on the other portions of the circuit. To accomplish this, the design would physically cut-out a sub-circuit from the schematic and paste it to another drawing sheet. In this manner, the netlister would not see the cut-out sub-circuit and, thus, it would not be executed by the simulator. Then to place the sub-circuit back into the schematic, it would have to be cut and pasted back in with the appropriate connections of wiring being made. This process is time consuming for the designer.

SUMMARY OF THE INVENTION

According to one embodiment of the present invention, a schematic editor for defining a schematic that is a graphical representation of an electrical circuit is provided. The schematic editor includes a schematic designer that allows a user to select one or more electrical components represented in graphical form and allows the user to connect the electrical components to define an electrical circuit describing a desired function. A disabling routine is provided that allows the selection of a portion of the electrical circuit and disables that portion.

According to a more limiting aspect of the present invention, the disabling routine disables an associated sub-function of the selected portion without removing the selected portion from the schematic diagram.

According to another embodiment of the present invention, a method of designing a schematic diagram of an electrical circuit is provided. One or more electrical components are provided for selection where the electrical components are represented in a graphical form. Connectivity of input and output signal lines to the electrical components can be made to define a schematic diagram of an electrical circuit that performs a first function when executed by a simulator. A user may select a sub-circuit within the electrical circuit such that the electrical circuit includes the selected sub-circuit and a non-selected sub-circuit each having an associated function. The associated function of either the selected sub-circuit or the non-selected sub-circuit is disabled from the electrical circuit causing the electrical circuit to perform a second function when executed by a simulator.

According to a more limiting aspect of the present invention, a dummy component and/or value is assigned in place of the disabled associated function.

One advantage of the present invention is that a user can easily and automatically disable a portion of a schematic diagram.

Still further advantages of the present invention will become apparent to those of ordinary skill in the art upon reading and understanding the following detailed description of the preferred embodiments.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

DETAILED DESCRIPTION OF ILLUSTRATED EMBODIMENT

Figure 1:
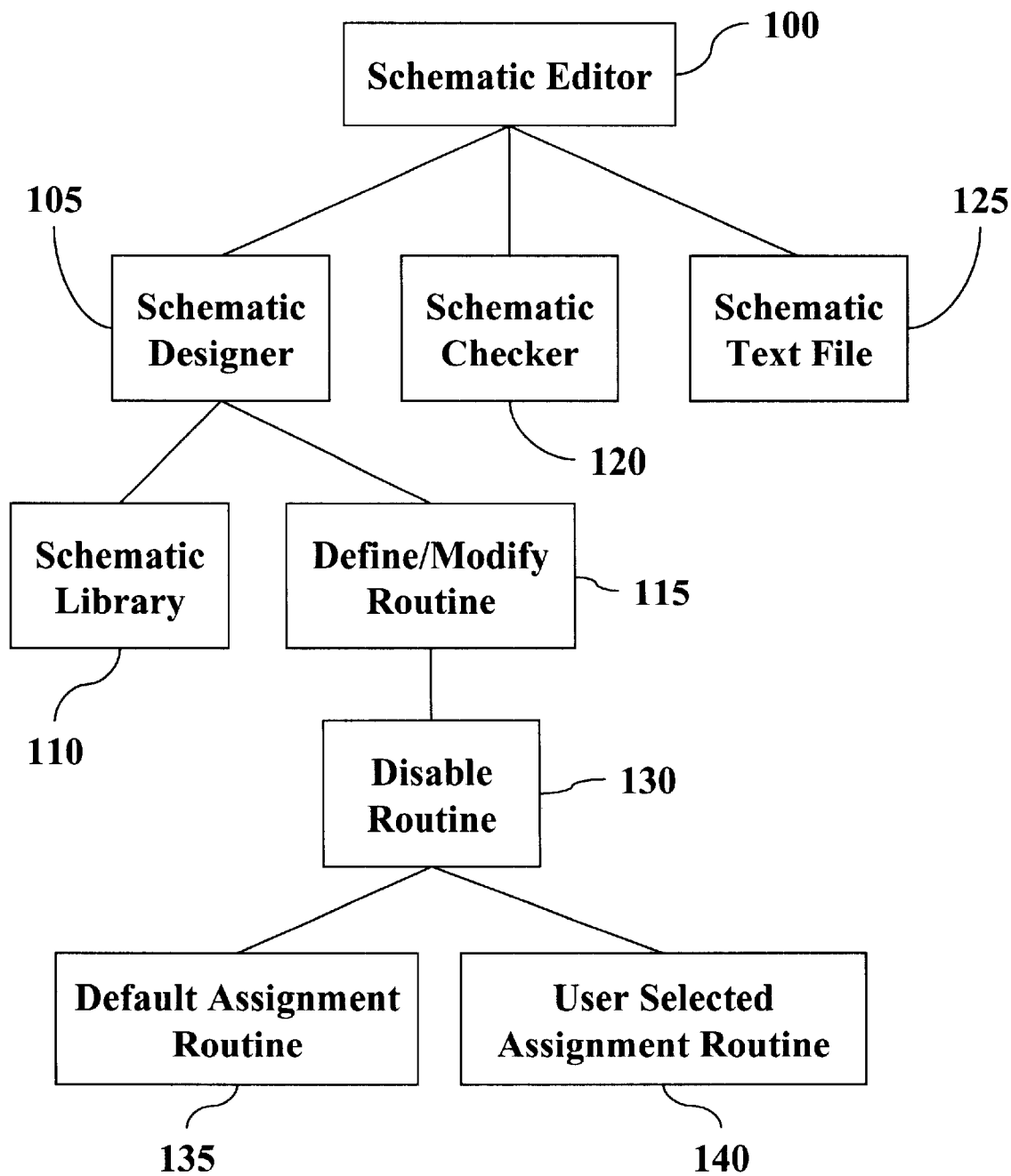
FIG. 1 is an exemplary component diagram of a schematic editor in accordance with the present invention.

Illustrated in FIG. 1 is an exemplary component diagram of a schematic editor 100 of the present invention. The schematic editor is a computer executable software application, for example the Xilinx® Schematic Editor, that allows a user to design and process an electronic circuit in graphical form known as a schematic diagram. The schematic editor 100 can be a stand-alone software application stored on a computer readable medium, a downloadable program from a network, an executable application by a network server, or can be configured in other manners as is known in the art.

The schematic editor 100 and its components as described below, include but are not limited to one or more software routines, algorithms, modules or computer executable instructions for performing functions as described herein. A schematic designer 105 is a routine or function provided by the editor 100 for creating a schematic diagram. A schematic library 110 is a database containing representations of circuit elements that are selectable by a user to form a schematic diagram as is well known in the art. For example, the library includes electronic components such as gates, resistors, clocks, flip-flops, multiplexers, processors, and other known circuit components. The library also includes connectors such as nets and pins where nets, also known as signal lines/wires, connect components together with input and output signal lines, and pins connect nets to components as is known in the art.

To define a new schematic or modify an existing one, a user initiates a define/modify routine 115. The routine 115 allows the user to select components from the schematic library 110 and connect them together to build a schematic diagram of a circuit that performs a desired function. AS is known in the art, a circuit function is described by the output signals it produces based on received input signals.

Figure 2:
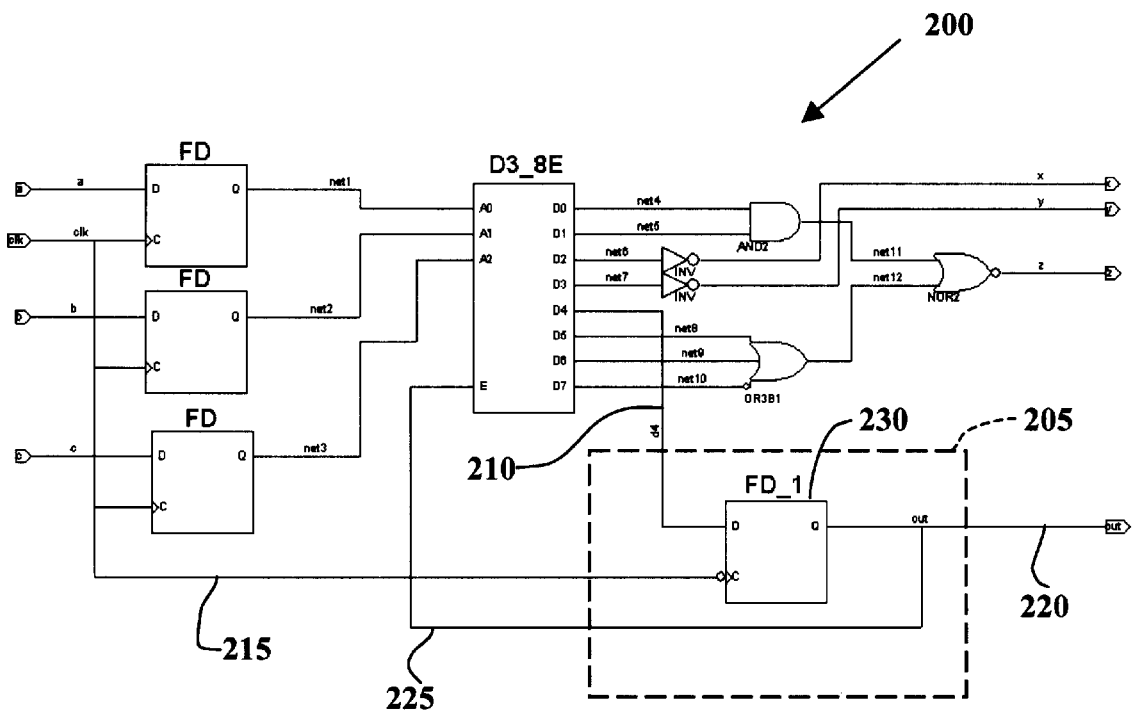
FIG. 2 is an exemplary schematic diagram of a circuit having a portion selected for disabling.

Illustrated in FIG. 2 is an exemplary schematic diagram 200 that may be generated by the define/modify routine 115 in accordance with instructions from a user. The illustrated schematic 200 includes input signals a, b c, and clock clk, flip-flops FD and FD_1, multiplexer D3_8E, gates, connection lines net1 to net12, net D4, net E, and outputs x, y, z, and out. The circuit shown in schematic 200 performs a function that produces a set of output values on output signal lines x, y, z and out based on the set of input values on input signal lines a, b, c and clk. Of course, any type and kind of schematic can be defined with the present invention and the schematic 200 is presented for exemplary purposes for explaining the illustrated embodiments.

With further reference to FIG. 1, in order to test the functionality of the circuit, a schematic checker routine 120 checks that the schematic has valid components, valid connections, valid names and other syntax as required by the editor 100 as is known in the art. The schematic is then converted to a text file 125 that is input to a circuit simulator and/or synthesis application. The text file 125 is a textual description of the components and connections of the circuit. One known manner to generate a text file of a schematic is to use Netlister. Netlister generates a hardware description language (HDL) file that can be executed by a circuit simulator and/or synthesis application. In particular, netlister generates a VHDL file (VHSIC Hardware Description Language, where VHSIC stands for very high speed integrated circuit.) There are several standard hardware description languages currently used in the art besides VHDL, for example, Verilog.

Circuit designers simulate a circuit many times during the course of building a schematic in order to test the functionality of the circuit and to debug the circuit for errors. Simulating a circuit can be time consuming especially as the complexity of the circuit increases. Rather than design and test a circuit as a whole, designers at times focus their attention to selected portions of the circuit and wish to ignore the other parts so they are not involved during testing or debugging.

With reference again to FIG. 1, a disable routine 130 allows a user to disable a selected portion of a schematic so that the disabled portion does not get simulated and/or synthesized. The disabling routine is analogous to "commenting-out" textual program code that a programmer does not wish to be executed. To disable a portion or sub-circuit of the schematic 200 shown in FIG. 2, the user selects, for example, sub-circuit 205 that is to be disabled. The disable routine 130 includes logic, for example computer executable instructions, that assigns a disable attribute/property to the selected sub-circuit 205. The disable attribute indicates to the system that the sub-circuit is to be disabled. In one embodiment, netlister can be programmed to recognize the disable attribute and ignore the sub-circuit associated therewith such that it is not included in the hardware description language generated for the schematic.

For convenience to the user, the disabled sub-circuit 205 is not removed from the schematic 200, but rather, the underlying function performed by the disabled circuit is removed. This is performed by modifying the textual description of the schematic that describes the components and connections/nets of the schematic. Thus, the schematic 200 will show the same circuit but the hardware description language will describe the disabled sub-circuit 205 so that its function is disconnected from the circuit 200. On the schematic, the disabled sub-circuit 205 is visually distinguished from the rest of the circuit by displaying it as "selected" and/or changing its color.

To disable or otherwise disconnect the function of sub-circuit 205, its input signal lines/nets, output signal lines/nets and components are re-assigned or removed. For example, the input signal lines/nets include d4 (line 210) and clk (line 215), which are shown to be connected to component FD_1. To disable them, the input signal lines/nets are re-assigned to be connected to a dummy component that does not contribute to the function of the circuit. The dummy component can be, for example, a resister connected to ground. For this function, the disable routine 130 includes logic, for example computer executable instructions, embodied in a default assignment routine 135 that automatically assigns such a dummy component as a default to input nets of a disabled sub-circuit. Of course, any predetermined default component(s) can be designated by the system.

For the output signal lines/nets, for example net "out" (line 220) and net "E" (line 225), the default assignment routine 135 assigns a default value to them such as a logic "0" or logic "1". For the components within the disabled sub-circuit 205, such as FD_1 (component 230), they are removed from the textual description of the schematic. By making default assignments, the disable routine 130 performs its function transparent to the user. Of course, if so desired, the schematic may be redisplayed showing the user the new assignments of the disabled sub-circuit 205.

It will be appreciated by those of ordinary skill in the art that certain nets, components and pins require certain valid connections and/or assignments in order to avoid receiving errors from the schematic checker 120 or receiving errors from a simulator and/or synthesizer. To eliminate receiving errors after disabling a sub-circuit, the default assignment routine 135 is configured to assign valid dummy nets, valid dummy components, and valid dummy values and to remove components as appropriate according to the circuit and syntax of the hardware description language being used. For some nets, e.g. a net coming from a clock, it is valid for it to have no assignment. If receiving errors is not a concern, then the default assignment routine 135 can be programmed to simply cut out the sub-circuit without making re-assignments to any hanging nets.

With further reference to FIG. 1, the disable routine 130 further includes logic, for example computer executable instructions, embodied in a user selected assignment routine 140. The routine 140 allows a user to select assignments to be associated with the nets, pins and components of the disabled sub-circuit 205 rather than assigning default values. In this manner, the routine 140 asks the user to identify an assignment for each element of the sub-circuit being disconnected. It will be appreciated that the default assignment routine 130 can include the user assignment features of routine 140.

Figure 3:
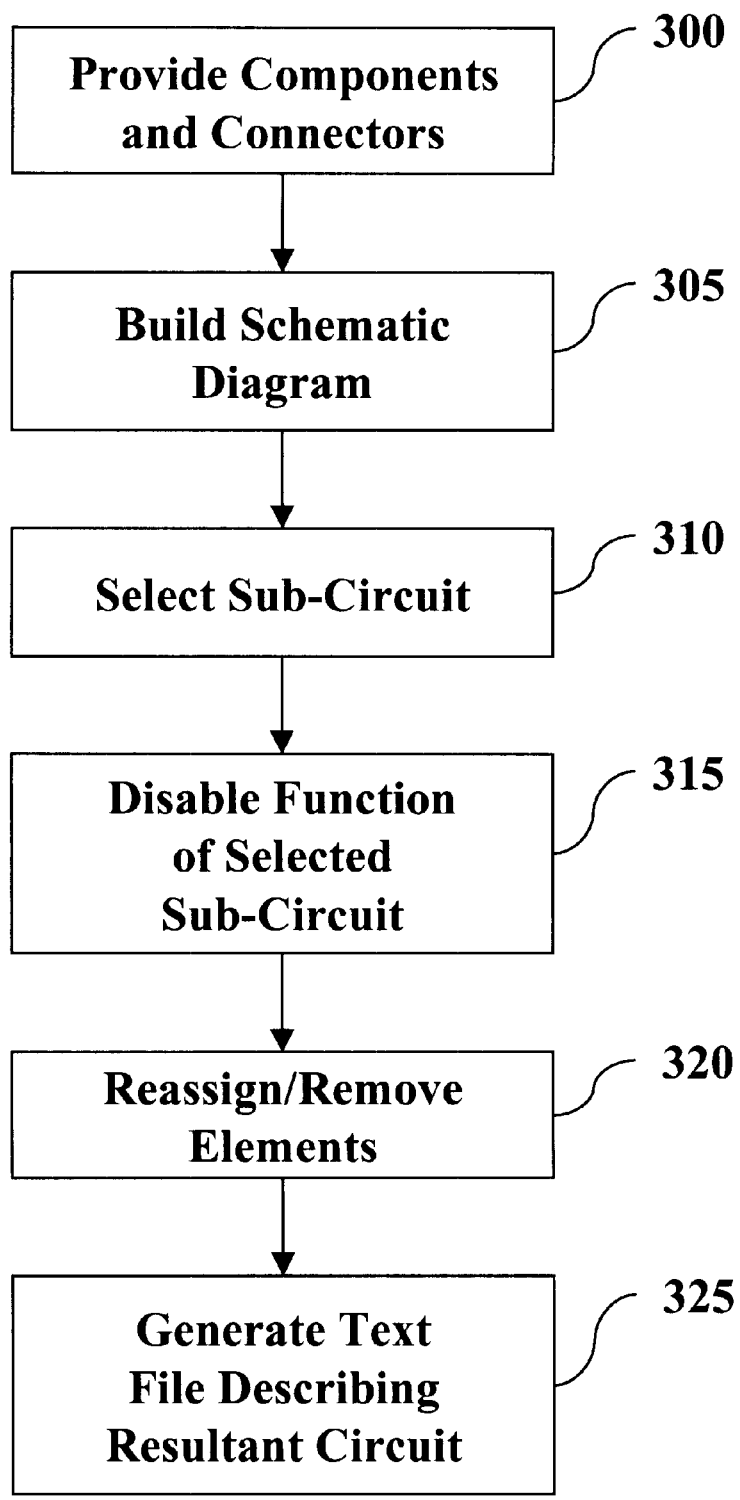
FIG. 3 is an exemplary diagram illustrating a methodology of the present invention.

Illustrated in FIG. 3 is an exemplary computer-implemented methodology of the schematic editor 100 for building a schematic in accordance with the present invention where the blocks represent functions, actions or events performed therein. It will be appreciated that computer software applications involve dynamic and flexible processes such that the illustrated blocks can be performed in other sequences different than the one shown. It will also be appreciated by one of ordinary skill in the art that the software of the present invention may be implemented using various programming approaches such as procedural, object oriented or artificial intelligence techniques.

Shown at block 300, circuit components, connectors and other circuit elements are provided, for example from the schematic library 110, that can be selected by a user. At block 305, the selected components are placed and connected together as instructed by the user in a schematic diagram being built. When the user wishes to disable a portion of the schematic, the portion is selected and its associated function is disabled, shown at blocks 310 and 315. At block 320, to disable the function, the elements of the sub-circuit (e.g. nets, pins, components) are reassigned to dummy components, reassigned to dummy values, or removed. A text file describing the resultant circuit of the schematic is then generated, shown at block 325.

As described previously, the selected portion identifies a sub-circuit within the schematic, for example sub-circuit 205 in FIG. 2. To disable its associated function, the elements of the sub-circuit are re-assigned or removed so that they do not contribute to the overall function of the circuit 200. Thus, after disabling the sub-circuit 205, the circuit 200 will perform a different function producing different output values. The re-assignments are performed in the textual description of the schematic so that the graphical schematic of the sub-circuit is not modified except for visually distinguishing it from the rest of the circuit to indicate that it is disabled. This may include changing the disabled circuit's color, highlighting it, enclosing it by lines, or other ways of distinguishing as is known in the art.

Since the disabled sub-circuit remains in the schematic, the user can easily re-activate the disabled sub-circuit by, for example, selecting it and turning off the disabling function. The textual description file is then modified to describe the sub-circuit being connected to the schematic. The nets and components are assigned back to their original values as they appear in the schematic.

In another embodiment, the disable routine 130 includes an option to disable the non-selected circuit rather than the selected one. This is advantageous when it is more convenient for a user to select a portion of the circuit that is to be tested due to the structure and/or complexity of the schematic diagram.

It will further be appreciated that the disabling routine 130 can apply the disabling function to more that one area of a circuit at a time. Thus, the user may select a plurality of sub-circuits throughout the schematic and disable them all.

The disabling routine 130 can also be regarded as a hiding mechanism. A sub-circuit selected to be disabled is effectively hidden from the netlister and hidden from a simulator or synthesis program. When a textual description is generated representing the schematic diagram, text corresponding to the selected sub-circuit is made to describe a different sub-circuit instead of the one shown in the schematic. As described previously, this is performed by, for example, assigning dummy components or values to the selected sub-circuit components, deleting the sub-circuit components, or the like. Thus, the disabled sub-circuit does not form part of the functioning circuit even though it forms part of the schematic diagram visible to the user.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. For example, the present invention can apply to any type of schematic generating application, programming language or hardware description language instead of the exemplary application shown above. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. A schematic editor for defining a schematic being a graphical representation of an electrical circuit, the schematic editor comprising:

a schematic designer for allowing a user to select one or more electrical components represented in graphical form and to connect the one or more electrical components to define an electrical circuit describing a desired function; and a disabling routine for selecting a portion of the electrical circuit where the portion performs a sub-function of the desired function, and the disabling routine disabling the sub-function from the electrical circuit, wherein the portion of the electrical circuit selected for disabling includes one or more input signal lines, the disabling routine further including a default routine for assigning a default dummy component to receive the one or more input signal lines.

2. The schematic editor as set forth in claim 1 wherein the disabling routine assigns an attribute to the portion selected indicating that the sub-function of the portion selected is disconnected from the electrical circuit.

3. The schematic editor as set forth in claim 1 wherein the disabling routine further visually distinguishes the portion selected in the graphical representation of the electrical circuit.

4. The schematic editor as set forth in claim 1 wherein the portion of the electrical circuit selected for disabling includes one or more output signal lines, the default routine further including a routine for assigning a default output value to the one or more output signal lines.

5. A schematic editor for defining a schematic being a graphical representation of an electrical circuit, the schematic editor comprising:

a schematic designer for allowing a user to select one or more electrical components represented in graphical form and to connect the one or more electrical components to define an electrical circuit describing a desired function; and a disabling routine for selecting a portion of the electrical circuit where the portion performs a sub-function of the desired function, and the disabling routine disabling the sub-function from the electrical circuit, wherein the portion of the electrical circuit selected for disabling includes one or more input signal lines, the disabling routine further including an assignment routine for assigning a user selected dummy component to receive the one or more input signal lines.

6. The schematic editor as set forth in claim 5 wherein the portion of the electrical circuit selected for disabling includes one or more output signal lines, the assignment routine further including a routine for assigning a user selected output value to the one or more output signal lines.

7. The schematic editor as set forth in claim 1 wherein the schematic designer further generating a text file describing the graphical representation of the electrical circuit; and the disabling routine disabling the sub-function of the selected portion by removing text from the text file corresponding to the selected portion.

8. The schematic editor as set forth in claim 7 wherein the disabling routine disables the sub-function of the selected portion without removing the selected portion from the graphical representation of the electrical circuit.

9. A method of designing a schematic diagram of an electrical circuit, the method comprising the steps of:

providing one or more electrical components for selection, the one or more electrical components being represented in a graphical form;

allowing connectivity of input and output signal lines to the one or more electrical components to define a schematic diagram of an electrical circuit that performs a first function when executed by a simulator;

allowing a user to select a sub-circuit within the electrical circuit such that the electrical circuit includes the selected sub-circuit and a non-selected sub-circuit each having an associated function;

disabling the associated function of one of the selected sub-circuit and the non-selected sub-circuit from the electrical circuit causing the electrical circuit to perform a second function when executed by a simulator; and generating text code describing the schematic diagram without including the disabled associated function of one of the selected sub-circuit and the non-selected sub-circuit, wherein the generating includes assigning a dummy component in place of the disabled associated function in the text code.

10. The method of designing a schematic diagram as set forth in claim 9 wherein the disabling further includes maintaining the schematic diagram without removing the disabled sub-circuit from the schematic diagram.

11. The method of designing a schematic diagram as set forth in claim 9 wherein the disabling disconnects the associated function such that the associated function does not contribute to the first function of the electrical circuit.

12. The method of designing a schematic diagram as set forth in claim 9 wherein the disabling includes assigning an attribute to the disabled associated function such that a simulator ignores the disabled associated function.

13. The method of designing a schematic diagram as set forth in claim 9 further including:

allowing the user to select a plurality of sub-circuits within the electrical circuit each having an associated function; and disabling the associated function of each of the plurality of sub-circuits selected.

14. A computer program having instructions executable by a computer for performing the method of claim 9.

* * * * *